July 17, 1962  R. R. LUHM  3,044,340
DRIVE PIN RIVET
Filed Jan. 14, 1960
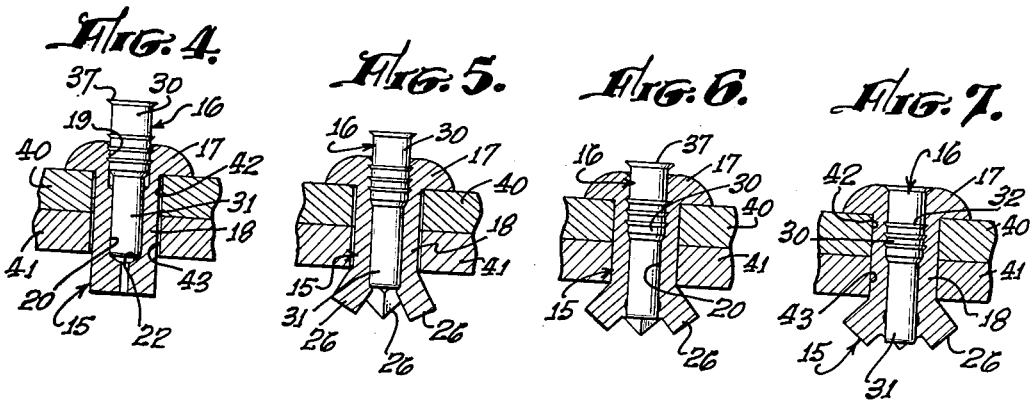
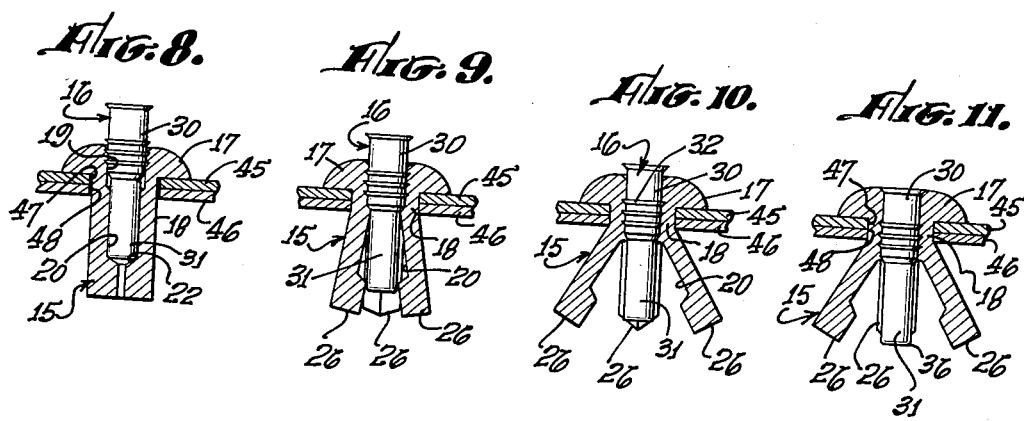
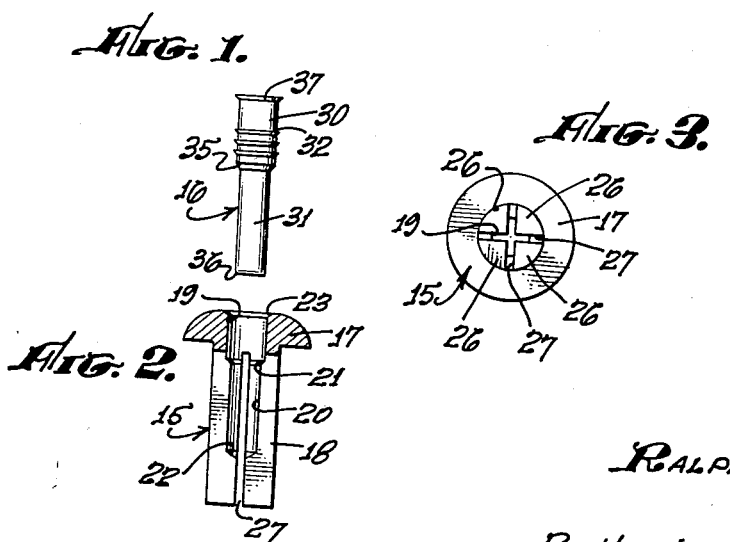
Ralph R. Luhm,
INVENTOR.
By His Attorneys.
Harris, Kiech, Russell & Kern.

United States Patent Office 3,044,340
Patented July 17, 1962

3,044,340
DRIVE PIN RIVET
Ralph R. Luhm, Anaheim, Calif., assignor to Olympic Screw & Rivet Corporation, Downey, Calif., a corporation of California
Filed Jan. 14, 1960, Ser. No. 2,522
2 Claims. (Cl. 85—40)

This invention relates to new and improved drive pin rivets for fastening plates or the like.

Ordinarily a particular size rivet is best adapted for joining plates of a particular total thickness and will operate satisfactorily over only a very small total thickness range. Therefore, the choice of rivet for a particular fastening job becomes critical and a wide range of sizes of rivets must be manufactured and stocked in order to meet various fastening problems. Accordingly, it is an object of the present invention to provide a new and improved drive pin rivet whereby a single size rivet can be used to provide highly satisfactory fastening over a wide range of total thicknesses. A further object is to provide such a rivet that will produce high clinching forces over the wide thickness range for drawing the plates tightly together. A further object is to provide such a rivet that is easily expanded to completely and solidly fill the openings in the plates being fastened. A still further object is to provide such a rivet that is easily set and requires a relatively small driving force.

A particular object of the invention is to provide a drive pin rivet which will produce satisfactory fastening over a minimum thickness range of ½₂ inch to ⁵⁄₃₂ inch. A further object is to provide such a rivet that will have a ¼ inch grip range with other minimum and maximum values.

It is an object of the invention to provide a drive pin rivet having a rivet body with an axial bore extending from the head end thereof, with a major diameter at said head end and a minor diameter remote from said head end, and a pin having a head portion of a major diameter and a sleeve portion of a minor diameter, with the head and sleeve portions of the pin being positionable in the major and minor diameters of the bore, respectively, and adapted to be driven into the body for spreading the body prongs and then expanding the body sleeve to set the rivet. A further object is to provide such a drive pin rivet wherein the major diameters are substantially the same and the minor diameters are substantially the same so that the pin is a sliding or push fit into the body. A still further object of the invention is to provide such a rivet wherein the minor diameter portion of the pin is longer than the minor diameter bore of the body so that the pin bottoms in the bore and spreads the prongs to produce a clinching force before the major diameter portion of the pin enters the minor diameter bore of the body to expand the body and fill the opening in the plates being fastened. Another object is to provide such a structure wherein, when joining relatively thin plates, the engagement of the major diameter portion of the pin with the minor diameter bore of the body further spreads the prongs to provide the additional clinching force desirable with the smaller grip range.

The invention also comprises novel details of construction and novel combinations and arrangements of parts, which will more fully appear in the course of the following description. The drawing merely shows and the description merely describes a preferred embodiment of the present invention which is given by way of illustration or example.

In the drawing:
FIG. 1 is a side view of a pin;

FIG. 2 is a longitudinal sectional view of a rivet body for use with the pin of FIG. 1;
FIG. 3 is a head end view of the body of FIG. 2;
FIGS. 4–7 show progressive steps in setting of the drive pin rivet with relatively thick plates; and
FIGS. 8–11 show progressive steps in setting of the drive pin rivet with relatively thin plates.

The drive pin rivet of the invention includes a rivet body 15 and a pin 16. The rivet body includes a head 17 and a sleeve 18, with the sleeve adapted to pass through aligned openings in one or more plates and with the head adapted to limit movement of the body through the openings, as seen in FIGS. 4 and 8. An axial bore is provided in the rivet body with the bore extending from the head end thereof and having a major diameter 19 at the head end and a minor diameter 20 remote from the head end. The major and minor diameter bores are preferably cylindrical, with a tapered step or shoulder 21 at the transition between the major diameter bore 19 and minor diameter bore 20 and a tapered bottom 22, these forms being more suitable for high speed, inexpensive manufacture. A countersink 23 may be provided at the open end of the bore.

The sleeve 18 is axially slit to divide the sleeve into a plurality of prongs. In the preferred form shown herein, the sleeve is slit crosswise to produce four prongs 26 with the slits 27 extending into the major diameter bore 19.

The pin 16 is designed for positioning in the bore of the rivet body 15 and includes a head portion 30 of a major diameter and a sleeve portion 31 of a minor diameter. The pin is made to be a slide or push fit into the rivet body with the sleeve portion 31 in the minor diameter bore and the head portion 30 in the major diameter bore, as seen in FIGS. 4 and 8. A plurality of ridges 32 may be provided on the head portion 30 with the ridges being an interference fit with the major diameter bore. The pin and body should be dimensioned so that the pin may be positioned in the body to the depth shown in FIGS. 4 and 8 without producing any significant dimensional change in the body. At the same time, there should be some gripping of the pin by the body so that the pin will remain in position. This is easily achieved by making the major diameters of the pin and bore substantially the same and the minor diameters substantially the same with the ribs 32 providing for retention of the pin in the body.

A tapered shoulder 35 and a chamfered corner 36 may be provided on the pin for ease of manufacture and a flange 37 may be provided on the head portion 30 to produce a smooth button when the pin is driven home.

The sleeve portion 31 of the pin is made longer than the minor diameter bore 20 so that the pin will engage the bottom 22 of the bore before the head portion 30 enters the minor diameter bore, as seen in FIGS. 4 and 8. In applications where the pin is to be flush with the rivet body when the fastener is set, as seen in FIGS. 7 and 11, the head portion 30 of the pin is made longer than the major diameter bore of the body so that the head portion will be driven into the minor diameter bore. Of course, where the pin is to project above the rivet body in the fully set rivet, the head portion would be even longer and where the pin is to be driven below the head of the rivet body, the head portion may be shorter than the major diameter bore.

In FIGS. 4–7, the preferred form of the drive pin rivet of the invention is shown fastening two relatively thick plates 40, 41. The pin and rivet body are ordinarily preassembled at the time of manufacture in the form shown in FIG. 4. The sleeve is passed through aligned openings 42, 43 in the plates and the pin is then driven into the body by application of a force to the head end of the pin. The pin engages the bottom 22 of the bore in the rivet body and spreads the prongs 26 to clinch or clamp the plates 40, 41 between the prongs and the head 17, as seen in FIG. 5. As the pin continues to progress through the body, the head portion 30 enters the minor diameter bore 20 producing expansion of the sleeve 18 to fill the openings in the plates, as seen in FIG. 6. The pin is driven flush with the head 17, as seen in FIG. 7, with the sleeve portion 31 further spreading the prongs 26 and with the head portion 30 further expanding the sleeve to rigidly set the rivet in place. The ridges 32 produce some sleeve expansion and serve to lock the pin securely in the rivet body.

The same rivet is shown in FIGS. 8-11, as used in fastening two relatively thin plates 45, 46. The sleeve is positioned in the aligned openings 47, 48, as seen in FIG. 8. The pin is then driven into the body with the pin engaging the bottom of the bore to spread the prongs, as seen in FIG. 9. As the plates 45, 46 are relatively thin, the spreading of the prongs 26 also tends to fill the openings 47, 48, as seen in FIG. 9. As the head portion 30 of the pin is driven into the minor diameter bore 20, the prongs 26 are spread further and the sleeve is expanded in the openings, as seen in FIG. 10. The pin is finally driven flush, as seen in FIG. 11, to complete the sleeve expansion and hole filling.

While the movement of the pin into the rivet body may be at a continuous rate, the construction of the rivet provides a two-step setting operation. This two-step setting occurs for both the maximum grip range, as shown in FIGS. 4-7, and the minimum grip range, as shown in FIGS. 8-11, as well as for intermediate grip ranges. In the first step, the sleeve portion of the pin engages the bottom of the bore and spreads the prongs to clinch the plates between the prongs and the head. This clinching operation occurs first regardless of the thickness of the plates being fastened so that the plates are pulled up tight. Then the head portion of the pin enters the minor diameter bore and expands the sleeve to fill the opening in the plates and lock the rivet in place. In the thicker gripping ranges, most of the prong spreading is produced by movement of the sleeve portion of the pin past the bottom of the bore, as seen in FIGS. 5, 6 and 7, while in the thinner gripping ranges, movement of the head portion of the pin into the minor diameter bore produces both prong spreading and sleeve expansion, as seen in FIGS. 10 and 11.

The unique design of the present rivet results in substantially no axial moving of metal of the rivet body in the area where the prongs are being spread. In the thicker gripping ranges, some metal movement occurs where the major diameter head portion 30 of the pin 16 engages the minor diameter 20 of the bore in the rivet body 15. But, as seen in FIG. 5, the zone of engagement is remote from the zone of prong spreading. In the thinner gripping ranges, substantially no metal movement occurs, as the aforesaid engagement primarily produces prong spreading. As there is no metal moving or stretching to weaken the prongs, a strong set rivet is achieved over a wide thickness range.

In one particular form of the drive pin rivet of the invention now in use, the same rivet is used for fastening members having a total thickness of 1/32 inch and members having a total thickness of 9/32 inch. It is significant to note that a relatively small force is required for driving the pin through the body which is of particular importance for thin plates in order to reduce the possibility of deforming the plates.

Although an exemplary embodiment of the present invention has been disclosed and discussed, it will be understood that other applications of the invention are possible and that the embodiment disclosed may be subjected to various changes, modifications and substitutions without necessarily departing from the spirit of the invention.

I claim as my invention:

1. In a drive pin rivet for fastening plates or the like having total thicknesses varying throughout a predetermined range, the combination of: a rivet body having a head and a sleeve, with said sleeve adapted to pass through aligned openings in the plates being fastened, said body having an axial bore extending from the head end thereof, with a major diameter at said head end and a minor diameter remote from said head end with the junction between the major and minor diameters defining a shoulder spaced from said head a distance less than the minimum value of said predetermined range, said sleeve being axially slit into a plurality of prongs having internal projections thereon at the bottom of said minor diameter portion of said bore, said projections having surfaces converging axially toward the outer end thereof; and a pin for driving into said body and having a head portion of a major diameter and a sleeve portion of a minor diameter, the junction between the major and minor diameters defining a shoulder for engaging the shoulder of said body, at least one of said shoulders tapering axially toward said minor diameter portion with said head and sleeve portions of said pin being of substantially the same diameters as and being slidably positioned in said major and minor diameters of said bore, respectively, and with said sleeve portion of greater length than said minor diameter bore of said body and said head portion of greater length than said major diameter bore whereby on being driven into said body, said pin engages said internal projections at the bottom of said bore and spreads said prongs and then engages the shoulder between said major and minor diameter bores and expands said sleeve in said openings.

2. A drive pin rivet as defined in claim 1 in which said pin includes at least one circumferential ridge on the head portion thereof with said ridge being an interference fit with said major diameter bore.

References Cited in the file of this patent

UNITED STATES PATENTS

| | | |
|---|---|---|
| 2,292,467 | Norsell | Apr. 11, 1942 |
| 2,302,590 | Waite | Nov. 17, 1942 |
| 2,326,855 | Hathorn | Aug. 17, 1943 |
| 2,389,479 | Austin | Nov. 20, 1945 |
| 2,877,682 | Barry et al. | Mar. 17, 1959 |

FOREIGN PATENTS

| | | |
|---|---|---|
| 819,041 | France | June 28, 1937 |
| 563,295 | Great Britain | Aug. 8, 1944 |
| 857,141 | Germany | Nov. 27, 1952 |